United States Patent
Kronenberger

(10) Patent No.: US 10,568,376 B2
(45) Date of Patent: Feb. 25, 2020

(54) METHOD OF ADORNING AN ARTICLE

(71) Applicant: Ronald Kronenberger, Riverwoods, IL (US)

(72) Inventor: Ronald Kronenberger, Riverwoods, IL (US)

( * ) Notice: Subject to any disclaimer, the term of this patent is extended or adjusted under 35 U.S.C. 154(b) by 125 days.

(21) Appl. No.: 14/323,157

(22) Filed: Jul. 3, 2014

(65) Prior Publication Data

US 2016/0000160 A1    Jan. 7, 2016

(51) Int. Cl.
*A42B 1/24* (2006.01)
*A41D 27/08* (2006.01)
(Continued)

(52) U.S. Cl.
CPC .............. *A42B 1/248* (2013.01); *A41D 27/08* (2013.01); *B29C 65/18* (2013.01);
(Continued)

(58) Field of Classification Search
CPC ........... A42B 1/248; A42B 1/062; A42B 1/24; A41D 27/08; Y10T 156/1062; Y10T 156/1066; Y10T 156/1074; Y10T 428/24033; Y10T 428/24273; Y10T 156/108; Y10T 156/1075; B44C 1/10;
(Continued)

(56) References Cited

U.S. PATENT DOCUMENTS 1,595,581 A * 8/1926 Stedman ................... B44C 1/26
428/67
2,245,202 A * 6/1941 Krasno ................ A41H 41/005
156/252
(Continued)

FOREIGN PATENT DOCUMENTS

GB        2107649 A     5/1983

OTHER PUBLICATIONS

International Search Report and Written Opinion, dated Jan. 6, 2016, in PCT/US15/55669.
(Continued)

*Primary Examiner* — Philip C Tucker
*Assistant Examiner* — Brian R Slawski
(74) *Attorney, Agent, or Firm* — Wood, Phillips, Katz, Clark & Mortimer

(57) ABSTRACT

A method of adorning an article including the steps of: providing a first layer; cutting the first layer along a first border edge that surrounds a discrete piece of the first layer; separating the discrete piece of the first layer from a remaining portion of the first layer to thereby produce a void within the first border edge; providing a pre-formed insert piece configured to fit within the void and having a second border edge having a shape that conforms to a shape of at least a portion of the first border edge; directing the insert piece into the void with the void and insert piece pre-aligned so that the second border edge is placed against or immediately adjacent to the first border edge where the first and second border edge shapes conform; with the insert piece directed into the void, fixing the insert piece and remaining portion of the first layer together to define an adornment assembly; and integrating the adornment assembly into an article to adorn the article.

18 Claims, 5 Drawing Sheets

(51) Int. Cl.
  *B44C 1/10* (2006.01)
  *B44C 1/26* (2006.01)
  *B32B 37/12* (2006.01)
  *B29C 65/48* (2006.01)
  *B29C 65/18* (2006.01)
  *B29C 65/56* (2006.01)
  *B29C 65/62* (2006.01)
  *B29C 65/72* (2006.01)
  *B29C 65/00* (2006.01)

(52) U.S. Cl.
  CPC ........ *B29C 65/4815* (2013.01); *B29C 65/565* (2013.01); *B29C 65/62* (2013.01); *B29C 65/72* (2013.01); *B29C 66/45* (2013.01); *B29C 66/4724* (2013.01); *B32B 2037/1215* (2013.01); *B32B 2451/00* (2013.01); *B44C 1/105* (2013.01); *B44C 1/26* (2013.01)

(58) Field of Classification Search
  CPC ........ B44C 1/105; B44C 1/26; B44C 1/1712; B32B 2451/00; B32B 37/1207; B32B 2037/1215; B32B 38/0004; B32B 2437/00; B32B 2437/04; B32B 2307/402; B29C 65/02; B29C 65/48; B29C 65/4815; B29C 65/62; B29C 65/72; B29C 66/40; B29C 66/41; B29C 66/45; B29C 66/47; B29C 66/472; B29C 66/4724; B29C 65/18; B29C 65/565; B29C 66/304; B29C 66/305
  USPC ........ 156/60, 63, 91, 92, 93, 250, 252, 256, 156/258, 263, 293, 297, 299, 304.1, 156/304.7; 2/195.1, 209.13; 40/329; 223/44; 428/131
  See application file for complete search history.

(56) References Cited

U.S. PATENT DOCUMENTS

| | | | |
|---|---|---|---|
| 2,636,837 A | 4/1953 | Summers | |
| 3,484,316 A * | 12/1969 | Dirrim | A47G 27/0243 156/63 |
| 4,047,300 A * | 9/1977 | Sweeney, Jr. | A41H 27/00 30/358 |
| 4,621,441 A * | 11/1986 | Wagner | G09F 3/00 36/1 |
| 4,697,362 A * | 10/1987 | Wasserman | A43B 3/0078 36/136 |
| 5,452,479 A | 9/1995 | Mostert | |
| 5,636,385 A | 6/1997 | Harrison | |
| 5,960,476 A | 10/1999 | Danzy | |
| 5,996,116 A | 12/1999 | Tate | |
| 6,418,562 B1 | 7/2002 | Shwartz et al. | |
| 6,519,779 B1 * | 2/2003 | Taguchi | A42B 1/248 2/195.1 |
| 7,411,659 B1 | 8/2008 | Gaetano | |
| 8,387,412 B2 | 3/2013 | O'Byrne | |
| 2003/0186011 A1 | 10/2003 | Sloot | |
| 2004/0079011 A1 * | 4/2004 | Shwartz | G09F 5/00 40/329 |
| 2004/0176005 A1 | 9/2004 | Nordstrom | |
| 2006/0143790 A1 * | 7/2006 | Kronenberger | A42B 1/248 2/184 |
| 2006/0212993 A1 * | 9/2006 | Wang | A42C 5/00 2/171 |
| 2007/0235125 A1 * | 10/2007 | Doeling | A41D 27/08 156/256 |
| 2008/0141567 A1 * | 6/2008 | Chen | A42B 1/248 40/1.5 |
| 2008/0173222 A1 | 7/2008 | Jurnovoy | |
| 2010/0160055 A1 * | 6/2010 | Suit | A63D 15/08 473/44 |
| 2010/0291336 A1 * | 11/2010 | Mason | D06Q 1/00 428/61 |
| 2012/0005808 A1 * | 1/2012 | Shwartz | B44C 1/105 2/195.1 |
| 2012/0073737 A1 * | 3/2012 | Tsai | B29C 43/146 156/245 |
| 2014/0208483 A1 * | 7/2014 | Tuohy | A42B 1/248 2/209.13 |

OTHER PUBLICATIONS

International Search Report, dated Sep. 17, 2015, in Application No. PCT/US2015/038930.
International Preliminary Report on Patentability, dated Jan. 3, 2017 in Application No. PCT/US2015/038930.
International Search Report and Written Opinion, dated Mar. 8, 2018, in International Patent Application No. PCT/US2018/012493.
International Preliminary Report on Patentability, dated Jul. 9, 2019 in International Application No. PCT/US2018/012493.
Extended European Search Report, dated May 13, 2019 in European Patent Application No. EP 15 90 1875.

* cited by examiner

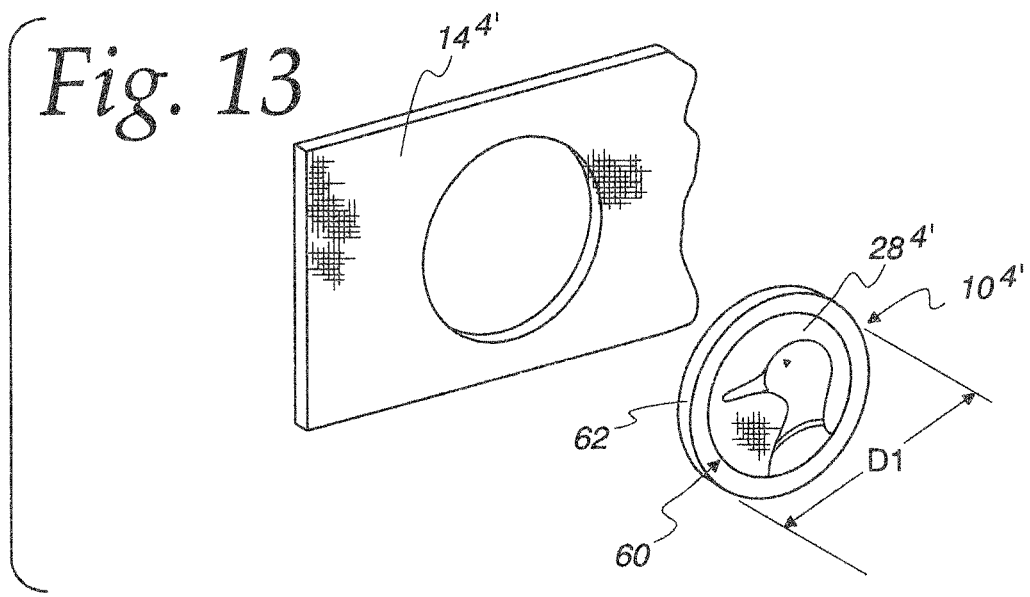
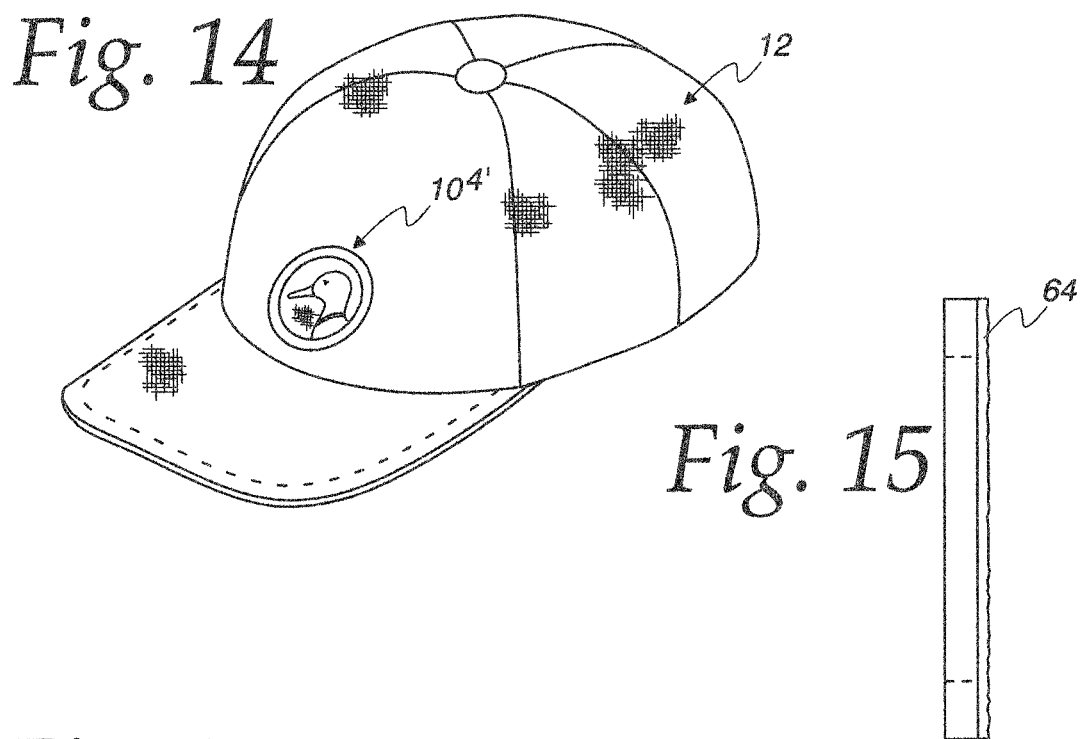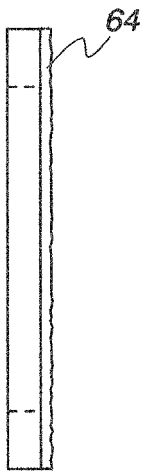
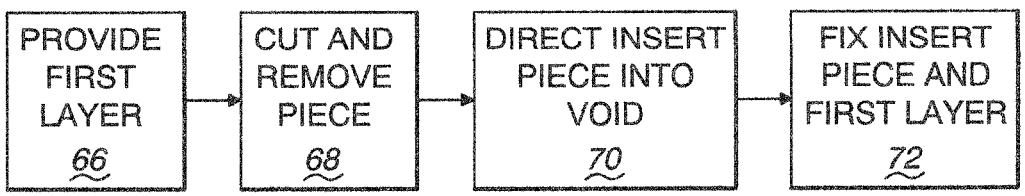

METHOD OF ADORNING AN ARTICLE

BACKGROUND OF THE INVENTION

Field of the Invention

This invention relates to articles such as apparel articles and, more particularly, to a method of adorning such articles.

Background Art

The apparel industry continues to be one of the most competitive consumer industries worldwide. Appearance is generally the most critical selling point for virtually all apparel. As a result, the industry has invested, and continues to invest, enormous sums in different ways to adorn apparel to make it more visually appealing than the apparel of their competitors.

Toward this end, a primary focus has been upon discrete adornment that is provided on virtually all types of apparel. This category includes a wide range of adornment types. The adornment may be in the form of a logo, informational lettering, an eye-catching design, representations of persons, places, and things, etc.

Most commonly, this type of ornamentation is applied on a continuous exposed surface of the article. That surface is normally defined by a layer that may be a cloth material, leather, etc.

As one example, ornamentation is commonly formed by embroidering a pattern upon such exposed, substrate surfaces. The embroidery process may utilize threads that contrast with the color and/or texture of the exposed substrate layer to produce an obvious contrast to highlight the added material.

Embroidery has some inherent drawbacks. First of all, embroidery equipment involves a significant financial investment. Further, the embroidery process typically produces a noticeable 3-dimensional projection on the substrate surface which is a look that may not always be desired. Additionally, it is difficult to make a sharp and distinct transition between the embroidered thread and the edge thereof at which the substrate is exposed. Instead, a somewhat rough edge is commonly produced which is worsened by thicker threads. Still further, it is difficult to form intricate shapes using the embroidery process, particularly when the shapes have a small footprint.

Another problem that arises with embroidery relates to the cutting of substrates to appropriately match an embroidered pattern. Oftentimes embroidered patterns are applied in varying free form designs. It may be difficult thereafter to set up the cutting equipment to make a desired matching perimeter edge, particularly since embroidered patterns may become random and numerous. Potentially, dies would be required for each variation.

As one example, the substrate is cut first to a particular embroidery pattern to be made. Precise alignment is required to properly match the cut substrate with the embroidery equipment. This can become expensive and lead to rejects and high cost per unit.

Woven ornamentation can be formed using a process that allows rather intricate shapes to be precisely formed with sharp transition edges, even with a design having a small areal extent. The weaving process is one that generally involves high end equipment that, as embroidery, demands a significant up-front equipment investment.

Another widely used method of producing ornamentation is to perform a screen printing operation. Once again, it is difficult to form precise shapes using this process. Further, the overall quality of screen printed ornamentation is generally less than that of the counterparts made by embroidery and weaving processes. Additionally, the integrity of the screen printed material depends upon the tenacity of its adherence to the substrate. On cloth, the degree of adherence is difficult to control. Even in a best case situation, over time, the screen printed material is prone to cracking, being rubbed off, and/or fading, which may detract significantly from the overall appearance of the associated article.

It is also known to pre-form adornment pieces that are subsequently applied to articles, as by stitching. Adornment of this type is made in a number of different manners and will commonly be pre-formed using one of the above techniques to produce a contrasting design on cloth, leather, or other sheet material.

The industry continues to seek out improved techniques for creating and applying ornamentation to all types of apparel articles, such as headwear, shirts, pants, blouses, accessories, etc. The driving design objectives are typically to produce a high quality, long lasting ornamentation that can be applied at a reasonable price.

SUMMARY OF THE INVENTION

In one form, the invention is directed to a method of adorning an article. The method includes the steps of: providing a first layer having a thickness between oppositely facing first and second surfaces; cutting the first layer fully between the first and second surfaces along a first border edge that surrounds a discrete piece of the first layer; separating the discrete piece of the first layer from a remaining portion of the first layer to thereby produce a void within the first border edge; providing a pre-formed insert piece configured to fit within the void and having a thickness between third and fourth surfaces and a second border edge having a shape that conforms to a shape of at least a portion of the first border edge; directing the insert piece into the void with the void and insert piece pre-aligned so that the second border edge is placed against or immediately adjacent to the first border edge along portions of the first and second border edges where the first and second border edge shapes conform; with the insert piece directed into the void, fixing the insert piece and remaining portion of the first layer together to define an adornment assembly; and integrating the adornment assembly into an article to adorn the article.

In one form, the insert piece and remaining portion of the first layer are fixed together as an incident of integrating the adornment assembly into the article.

In one form, the insert piece and remaining portion of the first layer are fixed together, with the first and third surfaces viewable together on the adornment assembly and contrasting visually at the first and second border edges where the second border edge is placed against or immediately adjacent to the first border edge.

In one form, the first and second border edges each has an extent. The first and second border edges conform closely in shape over substantially an entire extent of each of the first and second border edges.

In one form, the first layer is a felt layer.

In one form, the insert piece is formed from a felt layer.

In one form, the insert piece and remaining portion of the first layer are fixed together by fixing a first backing layer against the second and fourth surfaces.

In one form, the first backing layer is a double-sided fusible material.

In one form, the method further includes the step of fixing a second backing layer against the first backing layer. The steps of fixing the first and second backing layers involve fixing the first and second backing layers by fusion with an hydraulic fusing machine.

In one form, the thicknesses of the first layer and pre-formed insert piece are approximately the same.

In one form, the article is a headwear piece with an exposed surface against which the adornment assembly is placed.

In one form, the first and third surfaces are substantially flush with the insert piece directed into the void.

In one form, the step of integrating the adornment assembly into an article consists of securing the adornment assembly onto the article using a line of stitching.

In one form, the insert piece consists of a felt layer with a pattern formed on the third surface of the felt layer.

In one form, the method further includes the step of cutting the first layer around the insert to define a desired perimeter shape for the adornment assembly.

In one form, the method further includes the step of repeating the steps described above at first and second discrete locations on the first layer.

In one form, the invention is directed to an adornment assembly made according to the method described above.

In one form, the adornment assembly is provided in combination with an article into which the adornment assembly is integrated.

In one form, the article is an apparel article.

In one form, the article is a headwear piece.

BRIEF DESCRIPTION OF THE DRAWINGS

FIG. 13 is a view as in FIG. 12 wherein the insert piece is directed into the void and the first layer is cut to produce the adornment assembly;

FIG. 14 is a reduced, perspective view of the adornment assembly integrated into a baseball-style cap;

FIG. 15 is a side elevation view of the adornment assembly with an adhesive layer thereon; and FIG. 16 is a flow diagram representation of a method of adorning an article, according to the invention.

DETAILED DESCRIPTION OF THE PREFERRED EMBODIMENT

Figure 1:
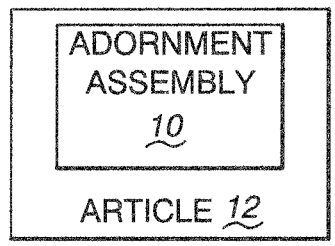
FIG. 1 is a schematic representation of an adornment assembly, according to the present invention, integrated into an article.

Referring to FIG. 1, an adornment assembly, according to the present invention, is shown in schematic form at 10 as integrated into an article 12 to adorn that article. The adornment assembly 10 and article 12 are shown in schematic form to encompass virtually a limitless number of different variations of each. The article 12, into which the adornment assembly 10 is integrated, may be virtually any type of article, but is preferably an article fitting in the category of "apparel". As one specific example, the adornment assembly 10 will be described below as integrated into a headwear piece, and specifically a baseball-style cap.

The adornment assembly 10 may also take virtually a limitless number of different forms. The adornment may be in the form of a logo, informational lettering, eye-catching designs, representations of persons, places, and things, etc. The invention contemplates virtually any type of addition made to the article 12 that serves an ornamental, aesthetic, or informational purpose.

To describe the invention, an exemplary design consisting of the letter "I" and a circular "dot" are shown formed in an adornment assembly in FIGS. 2-8. As noted above, the nature of the design itself is not critical to the present invention.

Figure 7:
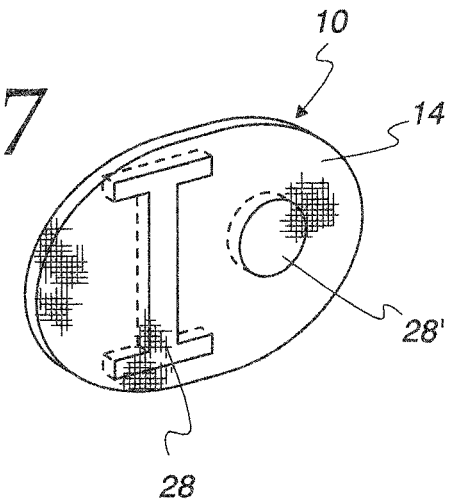
FIG. 7 is a perspective view of the adornment assembly cut from the first layer.
Figure 8:
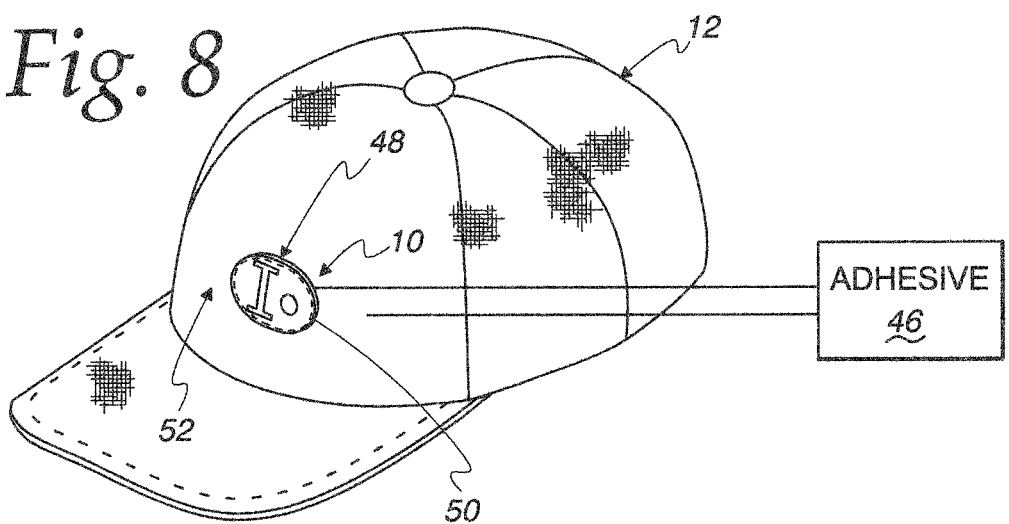
FIG. 8 is a reduced, perspective view of the adornment assembly in FIG. 7 integrated into an article in the form of a baseball-style cap.

A first layer 14 is used to form the adornment assembly 10, which is shown in completed form in FIGS. 7 and 8. The first layer 14 has a thickness T between first and second oppositely facing surfaces 16, 18, respectively. The first layer 14 may be a continuous supply of flexible material or a discrete quantity thereof.

Figure 2:
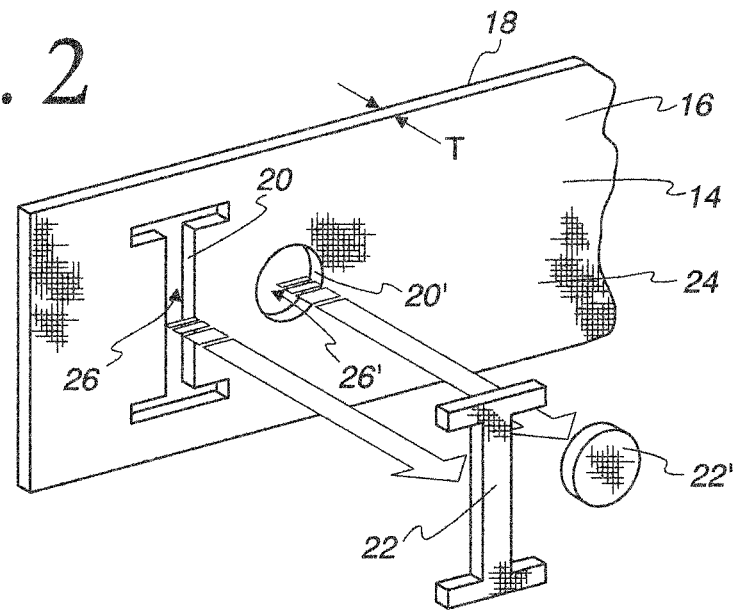
FIG. 2 is an exploded, perspective view showing a layer from which discrete pieces have been cut and separated to initiate the formation of one specific form of the inventive adornment assembly.

Using well-known technology, the first layer 14 is cut fully between the first and second surfaces 16, 18 along first border edges 20, 20' that surround discrete pieces 22, 22' of the first layer 14. As shown in FIG. 2, the discrete pieces 20, 22 are separated from a remaining portion 24 of the first layer 14 to thereby produce spaced voids 26, 26' within the first border edges 20, 20'.

Figure 3:
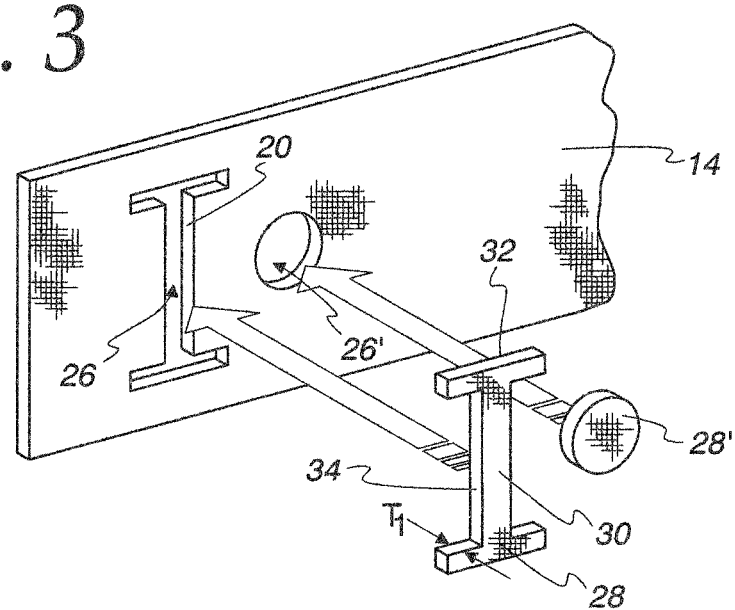
FIG. 3 is a view as in FIG. 2 wherein pre-formed insert pieces are being directed towards voids formed by the removed discrete pieces in FIG. 2.

As shown in FIG. 3, pre-formed insert pieces 28, 28' are provided that are configured to fit within the voids 26, 26', respectively. Exemplary insert piece 28 has a thickness T1 between third and fourth surfaces 30, 32, respectively, and a second border edge 34 having a shape that conforms to the shape of at least a portion of the first border edge 20. In this embodiment, the second border edge 34 conforms in shape to the first border edge 20 along its entire extent.

As shown at FIG. 3, the insert pieces 28, 28' are pressed into their respective voids 26, 26' with the insert pieces 28, 28' initially pre-aligned so that the exemplary second border edge 34 is placed against, or immediately adjacent to, the first border edge 20 along the portions of the first and second border edges 20, 34 where the first and second border edges 20, 34 conform in shape. In this embodiment, there is shape conformance along the full extent of each border edge 20, 34.

The insert pieces 28, 28' are then appropriately fixed to the remaining portion 24 of the first layer 14 by any of a number of different suitable means. It is possible that the insert pieces 28, 28' can be dimensioned relative to the dimensions of the voids 26, 26' so that the insert pieces 28, 28' are adequately held through frictional forces alone. The nature of the material making up the first layer 14 and insert pieces 28, 28', and the size of the insert pieces 28, 28' may contribute to making this possible.

Figure 5:
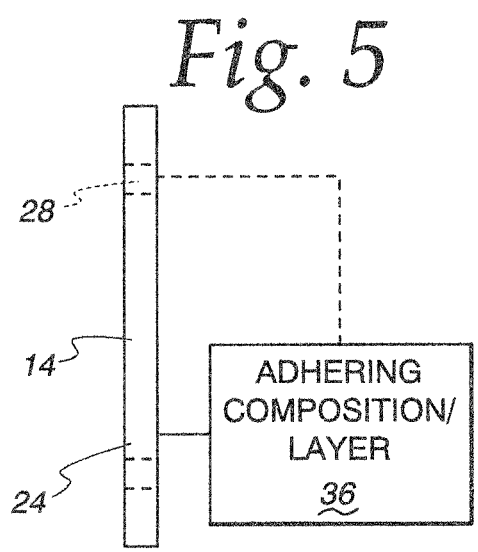
FIG. 5 is a view as in FIG. 4 and showing an alternative structure for fixing the insert pieces in the voids.
Figure 6:
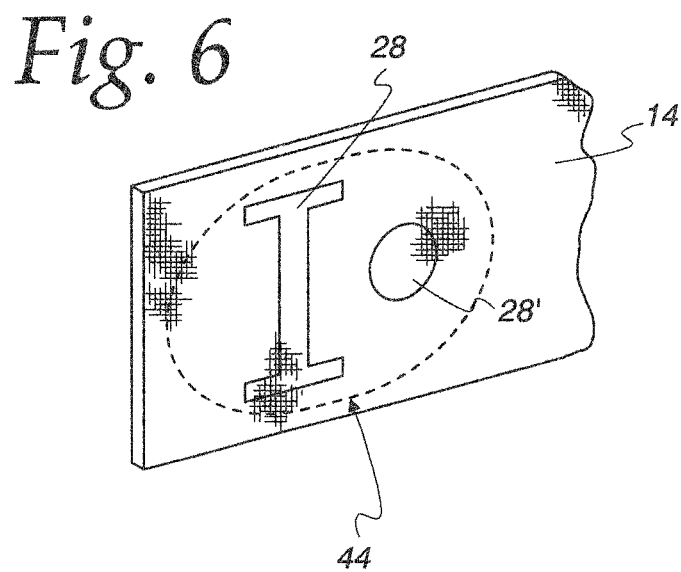
FIG. 6 is a view as in FIG. 3 with the insert pieces directed into the voids and with a desired end shape for the adornment assembly outlined in dotted lines.

Alternatively, as disclosed schematically in FIG. 5, an adhering composition/layer 36 may be used to fix the exemplary insert piece 28 to the remaining portion 24 of the first layer 14. The adhering composition 36 may be applied to act between the border edges 20, 34 and/or at the second and fourth surfaces 18, 32.

Figure 4:
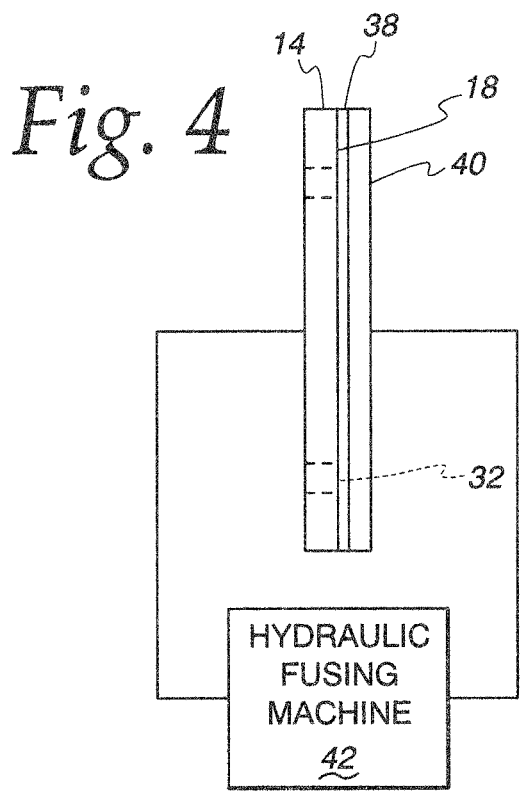
FIG. 4 is a side elevation view of the layer in FIG. 3 with the insert pieces directed into respective voids and with separate backing layers fixed through an hydraulic fusing machine.

Alternatively, as shown in FIG. 4, one or more backing layers 38, 40 may be applied at the second and fourth surfaces 18, 32. The first backing layer 38 may incorporate an adhesive. Preferably, the backing layer 38 is in the form of a double-sided fusible material. The backing layer 40 may be fixed against the first backing layer 38. In one form, an hydraulic fusing machine 42 may be used to fix the layers 38, 40 through a conventional fusion process.

Once the insert pieces 28, 28' are fixed, the adornment assembly 10 is effectively completed. The first layer 14 may initially be in a starting shape that represents the overall, end, desired configuration for the adornment assembly 10, as shown in FIGS. 7 and 8. Alternatively, the final desired shape may be cut from the first layer, as along the dotted line at 44 in FIG. 6, to allow cutting through the thickness of the first layer 14 to separate the adornment assembly 10, as shown in FIGS. 7 and 8.

As shown in FIG. 8, the adornment assembly 10 can be applied to an article 12, in this case shown as an exemplary headwear piece in the form of a baseball-style cap. The adornment assembly 10 is integrated into the article 12 preferably by use of at least one of an adhesive 46, and a line of stitching 48 that may extend partially or fully around, and slightly within, the perimeter edge 50 of the adornment assembly 10.

The insert pieces 28, 28' and remaining portion 24 of the first layer 14 may be fixed together as an incident of integrating the adornment assembly 10 into the article 12. For example, adhesive 46 applied to an exposed surface 52 of the article 12 may secure the first layer 14 and the insert pieces 28, 28' to the article 12 without requiring a separate fixing step.

The thicknesses T, T1, respectively of the first layer 14 and insert piece 28, may be the same or different. In one preferred form, the thicknesses T, T1 are the same so that the first and third surfaces 16, 30 are flush with the insert piece 28 pressed into the void 26. Alternatively, by making the thicknesses T, T1 different, the insert piece 28 can be either recessed within the void 26 or project slightly therefrom.

The first and third surfaces are preferably such as to be visually contrasting so that the insert pieces 20, 28' can be clearly discerned against the first layer 14. Preferably, this contrast is provided at the border edges 20, 34 for the exemplary insert piece 28. It is thus possible to make a sharp and distinct transition where the border edges 20, 34 meet or are in closely adjacent relationship.

The contrast does not have to be over the entire areal extent of the insert pieces 26, 26' at the first and third surfaces 18, 30. The contrast may be by reason of a difference in color, texture, or any other property that produces a visual contrast between the surfaces 16, 30.

Figure 9:
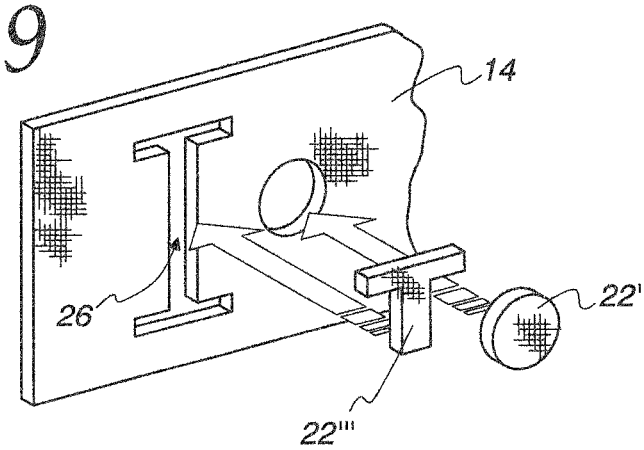
FIG. 9 is a view as in FIG. 2 using a modified form of insert piece that does not fully conform to a void into which it is directed.
Figure 10:
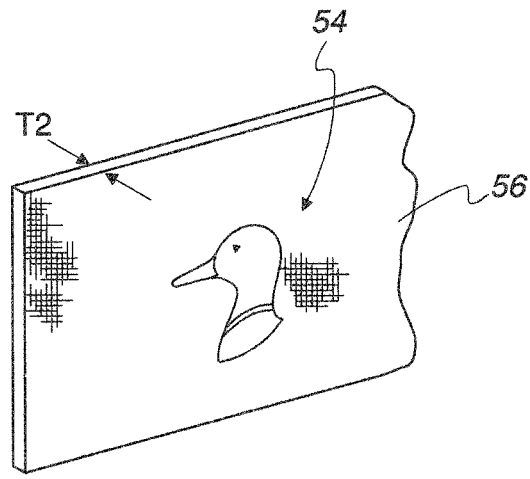
FIG. 10 is a perspective view of a layer having a pattern formed thereon to initiate formation of a modified form of adornment assembly, according to the invention.
Figure 11:
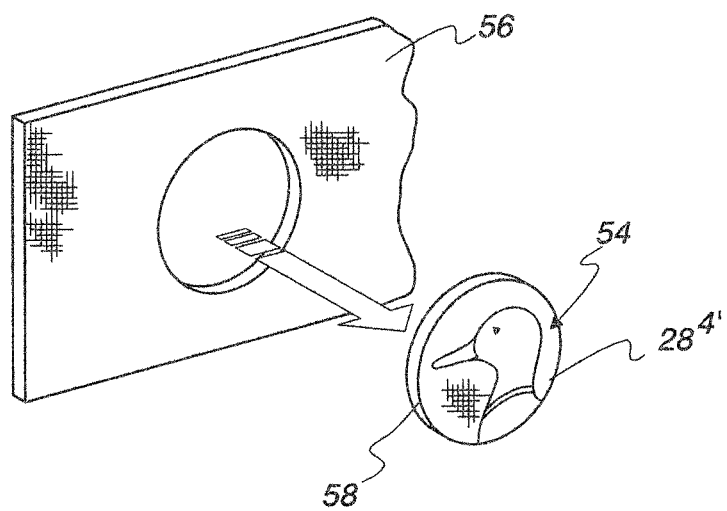
FIG. 11 is a view as in FIG. 10 wherein the layer has been cut to define an insert piece including the pattern.

While in one preferred form, each of the insert pieces 28, 28' closely conforms in shape around its outside perimeter edge to the inside perimeter edge bounding the respective void 26, 26', the invention contemplates a lesser conforming relationship. For example, in FIG. 9, the insert piece 22''', corresponding to the insert piece 22, fills only a portion of the void 26. The unfilled portion of the void 26 may provide a contrast by reason of the viewing therethrough of the exposed surface 52 of the article 12 upon which the adornment assembly 10 is applied.

In an alternative form, as shown in FIGS. 10-16, a pattern at 54 may be provided on a layer 56 with a thickness T2. In this embodiment, the pattern 54 is shown in the form of a duck's head, which is only exemplary in nature. The pattern 54 may be any shape or form that is provided for aesthetic and/or informational purposes. The pattern 54 may be applied to the layer 56 by any conventional means, including embroidery, weaving, screen printing, etc.

After forming the pattern 54 on the layer 56, an insert piece $28^{4'}$ is produced by cutting through the thickness T2 of the layer 56 to separate the insert piece $28^{4'}$ fully therefrom. The insert piece $28^{4'}$ has a resulting perimeter border edge 58 that extends fully around the pattern 54.

Figure 12:
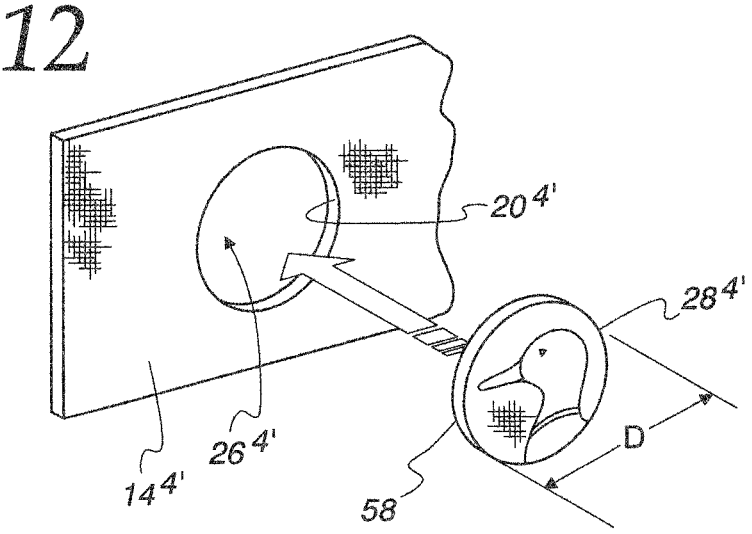
FIG. 12 is a perspective view showing the insert piece being directed into a void formed in a layer as in FIG. 2.

As shown in FIG. 12, the insert piece $28^{4'}$ is then directed into a void $28^{4'}$ in corresponding first layer $14^{4'}$ that is cut out with a border edge $20^{4'}$ matching the perimeter edge 58 at least partially, and more preferably fully, around its running extent. In this embodiment, the insert piece $28^{4'}$ has a circular shape with a diameter D. The circular shape is not a requirement.

As seen in FIG. 13, once the insert piece $28^{4'}$ is pressed into the void $26^{4'}$, the first layer $14^{4'}$ can be in turn cut in a circular shape with a dimension D1 that is greater than the dimension D, thereby producing an adornment assembly $10^{4'}$ with a contrasting border region 60 surrounding the insert piece $28^{4'}$. It is not necessary that the circular shapes of the insert piece $28^{4'}$ and perimeter outer edge 62 formed by cutting the layer $14^{4'}$ be concentric. In the embodiment shown, that is the case.

The resulting adornment assembly $10^{4'}$ is then integrated into the article 12, shown in FIGS. 14 and 15, as through the use of an adhesive layer 64 and/or through stitching, as shown in FIG. 8 for the adornment assembly 10.

In one preferred form, the first layer 14, $14^{4'}$ is made from a flexible felt material, which may also be used to form the various insert pieces 28, 28', $28^{4'}$. Felt lends itself to precision cutting so that a crisp edge is defined that can be matched closely to an adjacent abutting edge. The precision can be such that the insert pieces 28, 28', $28^{4'}$ are not discernible as elements separate from the first layers 14, $14^{4'}$. At the same time, the felt material has resiliency which allows close press fitting of the insert pieces 28, 28', $28^{4'}$ within their respective complementarily-shaped voids 26, 26', $26^{4'}$. However, virtually any type of material might be utilized with the materials making up the first layer 14, $14^{4'}$ and insert pieces 28, 28', $28^{4'}$ being either the same or different.

As one possible variable, the pattern 54 may be woven on the layer 56 with a construction wherein the thickness T2 of the layer 56 is less than the thickness of the first layer $14^{4'}$. A backing layer, such as the backing layers 38, 40, or another type of backing layer, may be applied to the back of the insert piece $28^{4'}$, with or without the border region 60, to build the thickness of the insert piece $28^{4'}$ up to that of the first layer $28^{4'}$ may be flush with the front of the first layer 14⁴'. A protruding or recessed arrangement is also contemplated for the insert piece 28⁴', with or without the border region 60.

With the structures described above, a method of adorning an article can be carried out as shown in block diagram form in FIG. 16.

As shown at block 66, a first layer is provided having first and second surfaces.

As shown at block 68, the first layer is cut fully between the first and second surfaces along a first border edge that surrounds a discrete piece of the first layer. The discrete piece of the first layer is separated from a remaining portion of the first layer to produce a void within the first border edge.

As shown at block 70, a pre-formed insert piece is provided that is configured to fit within the void. The insert piece has a thickness between third and fourth surfaces and a second border edge having a shape that conforms to a shape of at least a portion of the first border edge.

As shown at block 70, the insert piece is directed into the void with the void and insert piece pre-aligned so that the second border edge is placed against, or immediately adjacent to, the first border edge along portions of the first and second border edges where the first and second border edge shapes conform.

As shown at block 72, with the insert piece directed into the void, the insert piece and remaining portion of the first layer are fixed together to define the adornment assembly.

In carrying out one form of the invention, the parts of the adornment assembly may be cut by a programmable blade cutting machine where the pattern to be struck can be aligned while the outer perimeter of the substrate is being cut. Simultaneous alignment and cutting can occur to avoid the existing problems, particularly associated with free form embroidery.

The foregoing disclosure of specific embodiments is intended to be illustrative of the broad concepts comprehended by the invention.

The invention claimed is:

1. A method of adorning an article, the method comprising the steps of:
   providing a first flexible, resilient layer of a first material having a first thickness between oppositely facing first and second surfaces;
   cutting the first layer fully between the first and second surfaces along a first border edge that surrounds a discrete piece of the first layer;
   separating the discrete piece of the first layer from a remaining portion of the first layer to thereby produce a void within the first border edge;
   providing a pre-formed, flexible, resilient insert piece configured as a single fabric layer to fit within the void and having a thickness between third and fourth surfaces and a second border edge having a shape that conforms to a shape of at least a portion of the first border edge;
   directing the insert piece by itself into the void with the void and insert piece pre-aligned so that the second border edge is placed against the first border edge along portions of the first and second border edges where the first and second border edge shapes conform,
   the insert piece and void relatively dimensioned so that the insert piece is compressed within the void so that the first and second border edges are directly engaged, whereby the first material and fabric are urged directly against each other along the portions of the first and second border edges where the first and second border edge shapes conform as an incident of the insert piece being directed into the void and compressed, and
   fixing the insert piece and remaining portion of the first layer together and to an article while maintaining the first material and fabric urged directly against each other along the portions of the first and second border edges where the first and second border shapes conform to define an adornment assembly on the article that adorns the article,
   the first and third surfaces substantially flush with the insert piece and remaining portion of the first layer fixed to the article.

2. The method of adorning an article according to claim 1 wherein the insert piece and remaining portion of the first layer are fixed together as an incident of the insert piece and remaining portion of the first layer being fixed to the article.

3. The method of adorning an article according to claim 1 wherein with the insert piece and remaining portion of the first layer fixed together, the first and third surfaces are viewable together on the adornment assembly and the first and third surfaces contrast visually at the first and second border edges where the second border edge and first border edge are urged directly against each other whereby as an incident of the first and second border edges being urged directly against each other, there is a sharp visual transition between the visually contrasting first and third surfaces.

4. The method of adorning an article according to claim 1 wherein the first and second border edges each has an extent and the first and second border edges conform closely in shape over substantially an entire extent of each of the first and second border edges.

5. The method of adorning an article according to claim 1 wherein the first layer is a fabric layer.

6. The method of adorning an article according to claim 5 wherein the insert piece is formed from a felt layer and the first layer is a felt layer.

7. The method of adorning an article according to claim 1 wherein the insert piece and remaining portion of the first layer are fixed together by fixing a first backing layer against the second and fourth surfaces.

8. The method of adorning an article according to claim 7 wherein the first backing layer is a double-sided fusible material.

9. The method of adorning an article according to claim 8 further comprising the step of fixing a second backing layer against the first backing layer, wherein the steps of fixing the first and second backing layers comprise fixing the first and second backing layers by fusion with an hydraulic fusing machine.

10. The method of adorning an article according to claim 9 further comprising the step of cutting the first layer around the insert to define a desired perimeter shape for the adornment assembly.

11. The method of adorning an article according to claim 1 wherein the thicknesses of the first layer and pre-formed insert piece are approximately the same.

12. The method of adorning an article according to claim 1 wherein the article is a headwear piece with an exposed surface against which the adornment assembly is placed.

13. The method of adorning an article according to claim 1 wherein the first and third surfaces are substantially flush fully around the void with the insert piece directed into the void.

14. The method of adorning an article according to claim 1 wherein the step of fixing the insert piece and remaining portion of the first layer together and to the article comprises securing the adornment assembly onto the article using a line of stitching.

15. The method of adorning an article according to claim 1 wherein the insert piece comprises a felt layer with a pattern formed on the third surface of the felt layer.

16. The method of adorning an article according to claim 1 further comprising the step of performing the cutting and separating steps at first and second discrete locations on the first layer to produce first and second voids, and directing first and second insert pieces into the first and second voids, respectively.

17. The method of adorning an article according to claim 1 wherein the adornment assembly has a thickness that is not substantially greater than the first thickness.

18. The method of adorning an article according to claim 1 wherein a part of the insert piece is captively maintained directly between spaced parts of the first border edge.

* * * * *